(12) United States Patent
Heys et al.

(10) Patent No.: US 8,722,139 B2
(45) Date of Patent: May 13, 2014

(54) TRANSPARENT ARTICLE

(76) Inventors: James Brian Heys, Royston (GB); Jeremy Heys, London (GB)

(*) Notice: Subject to any disclaimer, the term of this patent is extended or adjusted under 35 U.S.C. 154(b) by 0 days.

(21) Appl. No.: 12/573,908

(22) Filed: Oct. 6, 2009

(65) Prior Publication Data

US 2011/0086672 A9    Apr. 14, 2011

Related U.S. Application Data

(63) Continuation of application No. 10/484,190, filed as application No. PCT/GB02/03308 on Jul. 19, 2002, now abandoned.

(51) Int. Cl.
*B05D 5/06* (2006.01)

(52) U.S. Cl.
USPC .......... 427/164; 427/162; 427/256; 427/384; 427/427.4; 427/487

(58) Field of Classification Search
USPC .............. 427/162–169, 384, 427.4, 487, 256
See application file for complete search history.

(56) References Cited

U.S. PATENT DOCUMENTS

| | | | | |
|---|---|---|---|---|
| 3,935,367 A * | 1/1976 | Merrill et al. | | 428/336 |
| 4,348,456 A * | 9/1982 | Imanaka et al. | | 428/336 |
| 5,619,288 A | 4/1997 | White | | |
| 5,633,049 A * | 5/1997 | Bilkadi et al. | | 427/487 |
| 5,693,422 A | 12/1997 | Basil et al. | | |
| 5,902,648 A | 5/1999 | Naka et al. | | |
| 6,207,728 B1 * | 3/2001 | Sekiguchi et al. | | 522/83 |
| 6,250,760 B1 | 6/2001 | Treadway | | |
| 6,358,601 B1 | 3/2002 | Bilkadi | | |
| 6,558,753 B1 * | 5/2003 | Ylitalo et al. | | 427/466 |
| 6,727,970 B2 | 4/2004 | Grace et al. | | |
| 2001/0005942 A1 | 7/2001 | Patton | | |
| 2001/0041251 A1 | 11/2001 | Bravet | | |

FOREIGN PATENT DOCUMENTS

| | | |
|---|---|---|
| EP | 1 008 873 A1 | 6/2000 |
| EP | 1 065 533 A2 | 1/2001 |
| EP | 1089093 | 4/2001 |
| JP | 57076034 | 5/1982 |
| JP | 08020076 | 1/1996 |
| JP | 09325208 | 12/1997 |
| JP | 11142608 | 5/1999 |
| JP | 2000056317 | 2/2000 |
| JP | 2000108216 | 4/2000 |
| WO | WO 01/81466 | 11/2001 |
| WO | WO 02/079328 | 10/2002 |

OTHER PUBLICATIONS

Hayes et al, Micro-Jet Printing of Polymers for Electronics Manufacturing, Proceedings of 3rd International Conference on Adhesive Joining and Coating Technology in Electronics Manufacturing, IEEE press, 1998, pp. 168-173.*
International Search Report from parent application PCT/GB02/03308 dated Feb. 11, 2003.
MacFarlane et al., Microjet Fabrication of Microlens Arrays, IEEE Photonics Technology Letters, IEEE Inc. New York, US, vol. 6, No. 9, Sep. 1, 1994, pp. 1112-1114 XP000468077 ISSN: 1041-1135.
English equivalent of JP 5707603A, JPO, 1982.
Hayes et al., "Micro-Jet Printing of Polymers for Electroics Manufacturing", Proceedings of 3rd International Conference on Adhesive Joining and Coating Technology in Electronics Manufacturing, 1998, pp. 168-173, IEEE Press, Binghampton, NY, USA.

* cited by examiner

*Primary Examiner* — Elizabeth Burkhart
(74) *Attorney, Agent, or Firm* — Maier & Maier, PLLC

(57) ABSTRACT

A method of producing a transparent article comprised of a transparent base substrate and having a thickness of at least 100 microns and a surface costing of a transparent resin wherein the resin is applied to the base substrate by means of a jet printer, preferably an ink jet printer. The transparent article may be a window for a display device, e.g. incorporated in a mobile telephone.

11 Claims, No Drawings

TRANSPARENT ARTICLE

CROSS-REFERENCE TO RELATED APPLICATIONS

This application is a continuation of U.S. Ser. No. 10/484,190 filed May 24, 2004, which is a national stage entry of PCT/GB02/03308 filed Jul. 19, 2002, which claims the benefit of GB 0117568.6 filed Jul. 19, 2001.

DESCRIPTION

The present invention relates to transparent articles and more particularly to a method of producing transparent articles having a coating thereon, e.g. to improve their abrasion resistance and/or optical properties. The invention relates particularly, but not exclusively, to the production of transparent articles for use as windows in display devices.

Display units in articles such as calculators and mobile phones generally have a transparent (usually plastics) window with a thickness of at least 100 microns (e.g. 200 microns) which acts as a protective barrier for the display device yet allows the information displayed to be viewed by the user.

For many applications it may be desired to improve the surface characteristics of the window to avoid factors such as abrasion, glare in strong or direct sunlight and fogging in cold and/or humid conditions and for this purpose various coats have been employed These coatings have been applied to the screen by techniques including May coating dip coating and flow coating.

Whilst the coatings have improved the physical and optical properties of the display screens the coating methods themselves have a number of disadvantages associated therewith. In particular, the methods are capital intensive, requite substantial facilities and services therefor and need highly qualified technical support.

In addition it is very labour intensive using the above methods to coat selected areas of the surf as this can only be achieved by masking of the areas of the surfaces that are to remain uncoated.

It is an object of the present invention to obviate or mitigate the problems outlined above.

According to a first aspect of the present invention there is provided a method of producing a transparent article comprised of a parent base substrate having a thickness of at least 100 microns and a surface coating of a transparent resin wherein the resin is applied to the base substrate by means of a jet printer.

According to a second aspect of the invention there is provided a transparent article produced by the method of the preceding paragraph.

Thus in accordance with the invention a transparent resin coating is applied to the transparent base substrate by means of a jet printer. Such printers provide a particularly convenient method of applying the coating (which may be continuous or discontinuous) since they may be operated under computer control to provide the coating on the desired areas of the substrate. Furthermore such printers are readily available and provide a relatively cheap means for the accurate application of the coating in the mass production of transparent articles.

Generally the substrate will have a thickness of at least 125 microns preferably at least 150 microns, more preferably at least 175 microns and most preferably at cast 200 microns. Typically the thickness will be at least 300 and more preferably at least 400 microns. Generally the thickness of the substrate will be at most 20 mm, preferably at most 15 mm more preferably at most 12 mm and most preferably at most 10 mm. Typically the thickness of the substrate will be at most 8 mm, more preferably at most 6 mm, even more preferably at most 5 mm and typically at most 4 mm.

Most usually, the thickness will be in the range 750 microns to 3 mm.

The coating that is applied may for example be one which improves the abrasion resistance of the base substrate (a so-called "hardcoat") and/or the optical properties thereof (e.g. an anti-fog coating). The coating may incorporate a dye or pigment whilst still retaining its transparency.

It is preferred that the jet printer is an ink-jet printer or a bubble jet printer. Most preferably the printer is an ink-jet printer. A particularly suitable printer is available from WEBER, model ML 500.

An ink-jet printer has a plurality (e.g. 96) of ink-jets. The jets may be operated continuously or may be operated in accordance with a particular programmed pate for applying the coating. By operating the jets in accordance with such a program coating of selective areas of the substrate may be achieved For example portions of the substrate that need to be affixed to other members in order to form an assembled device can be selectively left uncoated, e.g. edge portions.

The invention may be used for the coating of transparent substrates of relatively small size, e.g. having a longitudinal dimension of up to 20 cm and a transverse dimension of up to 15 cm. Such substrates may be fed in succession to the jet printer for the coating operation to be effected so that relatively small coated articles may be produced at a high rate. The invention may, however, also be used for the coating of larger substrates. A digital ink-jet printer having a number of printing heads is particularly suitable for the coating of larger substrates.

The invention is particularly applicable to the application of coatings onto base substrates of a plastics material which may be a thermoplastics or thermoset material. Examples of suitable plastics include polycarbonates, polyacrylics, polyesters and allyl carbonate (CR39). Alternatively the transparent substrate may be of glass.

The resin to be applied by the jet printer is preferably formulated as a solution or suspension in an appropriate carrier liquid. It is particularly preferred that the solution or suspension has a viscosity of 50 to 500 cP as measured on a Brookfield RVT Viscometer, Spindle No. RV2, 20 rpm at 25.degree. C. Solutions or suspension of such viscosity are particularly suitable for formation of a coating by a jet printing technique Various types of resin may be applied by the technique of the invention, e.g. polyurethanes, acrylates siloxanes, acrylics and combinations thereof. It is particularly preferred that the resin is cross-linkable so as to be capable of forming a cured coating on the base substrate. Cross linking may, for example, be by means of air drying, uv curing or thermal curing.

"Hardcoats" will generally be based on either acrylate or siloxane chemistry and cured using either uv or thermal means. Anti-fog coatings may for example be based on hydrophilic polyurethanes.

A particularly preferred embodiment of the method of the invention comprises feeding transparent articles in succession to the jet printer and then through a drying tunnel and a curing station. The coating is applied at the printer and residual solvent is removed on passage of the substrates through the drying tunnel. Finally the curing station effects cross-linking of the resin (preferably by uv curing) to form a coherent coating thereof on the transparent substrate.

The thickness of the rein coating will depend on the intended application of the substrate and/or the nature of the coating but will generally be in the range of 5 to 100 microns, more preferably 5 to 50 microns. In the case of a "hardcoat" for improving abrasion resistance the coating thickness will typically be 5-8 microns since increasing the thickness does not have any beneficial effects on the coating performance and may in fact be counter productive. In contrast the performance of anti-fog coatings is improved by increasing coating thickness so that values in the range 10 to 20 microns or higher may be most beneficial.

For preference the method of the invention is performed in a "clan" environment, i.e. an environment that is substantially free from dust and other atmospheric components which may detrimentally affect the coating process by affecting the binding of the resin to the base substrate and/or its subsequent curing.

Preferably the method of the invention is carried out in an environment separated from the ambient atmosphere. This may be achieved by opening the method of the invention in a "tent", particularly a tent which has its own integral air/gas supply. In this way the tent atmosphere may be modified, e.g. to provide an inert atmosphere for the coating process and/or a positive tent pressure (i.e. a pressure above atmospheric) to exclude contaminants.

As indicted above, the resin may be one which is intended to provide an abrasion reset coating on the transparent base substrate and/or improve the optical properties thereof e.g. by way of being an anti-glare or anti-mist coating.

The invention is particularly applicable to the application of abrasion resistant coatings to plastics substrates. Abrasion resistance may be measured in accordance with ASTM D-1044 in which a CS10F standard wheel having a 500 gram load is rotated 100 times on a sample. The HAZE value of the abraded substrate may then be measured. Uncoated acrylic and uncoated polycarbonates substrates give HAZE values of around 30% and 33% respectively (the exact value depending on thickness and source of supply). Use of the invention to apply a "hardcoat" to these substrates mikes it possible to reduce these HAZE values to less than the 10% maximum permitted by the ASTM specification. It is possible, for example, to reduce the HAZE values to and typically to 24% and even lower in certain cases, e.g. 1-1.5%.

The advantages obtained in accordance with the method of the invention render it particularly suitable for the production of transparent substrates for use in a display device (e.g. LCD device) in a mobile phone or calculator.

Therefore in accordance with a third aspect of the present invention there is provided a display device having a display window which is a transparent article in accordance with the second aspect of the invention.

The method of the invention may for example be used to produce a window (for a mobile phone or other item with a display device) from a pre-moulded transparent substrate to which is then applied a transparent coating in accordance with the method of the invention. Optionally the transparent substrate may also be provided with an opaque boarder formed of appropriately pigmented resin. The boarder may be applied to the same side as, or opposite side to, that to which the transparent coating has been applied. In either case the opaque border may be applied by pad coating or by means of a jet printer. The use of a jet printer will be particularly convenient when the opaque boarder is applied to the same side of the substrate as the transparent coating.

The invention claimed is:

1. A method of producing a transparent article comprised of a transparent base substrate of a plastics material having a thickness of at least 200 microns and an abrasion resistant surface coating of a transparent resin, wherein the uncoated transparent base substrate has a HAZE value as measured in accordance with ASTM D-1044 in excess of 30%, comprising:
    applying a coating of a curable u.v. resin composition including curable u.v. resin materials and a solvent to the substrate by means of an ink jet, wherein the uncured resin composition has a viscosity of 60 to 500 cP and
    after application of the curable resin composition, feeding the substrate successively through a drying station and a u.v. curing station to form said abrasion resistant coating of transparent resin, the coating of said abrasion resistant resin having a thickness of from 5 to 100 microns, and said abrasion resistant resin coating providing the coated substrate with a HAZE value of less than 10%.

2. A method according to claim 1, wherein the transparent base substrate has a thickness of at least 300 microns.

3. A method according to claim 2 wherein the transparent based substrate has a thickness of at least 400 microns.

4. A method according to claim 3 wherein the transparent base substrate has a thickness of 750 microns to 3 mm.

5. A method according to claim 1, wherein selected areas of the substrate remain uncovered.

6. A method according to claim 1, wherein the transparent base substrate has a longitudinal dimension up to 20 cm and a transverse dimension up to 15 cm.

7. A method according to claim 1, wherein substrates are fed successively to the jet printer for the coating operation to be effected.

8. A method according to claim 1, wherein the plastics material is polycarbonate, polyacrylic, polyester or allyl carbonate.

9. A method according to claim 1, wherein the resin coating thickness is from 5-50 microns.

10. The method according to claim 9 wherein the resin coating has a thickness of from 5 to 8 microns.

11. The method according to claim 1 wherein the transparent article is adapted to be incorporated in a display device.

* * * * *